United States Patent [19]

Murphy

[11] Patent Number: 4,880,306
[45] Date of Patent: Nov. 14, 1989

[54] METHOD OF CHECKING COLLINEARITY

[75] Inventor: Bernard J. Murphy, Mountain Lakes, N.J.

[73] Assignee: Ingersoll-Rand Company, Woodcliff Lake, N.J.

[21] Appl. No.: 278,193

[22] Filed: Nov. 30, 1988

[51] Int. Cl.[4] .............................................. G01B 11/27
[52] U.S. Cl. ................................................... 356/153
[58] Field of Search ................ 356/138, 153, 154, 399

[56] References Cited

U.S. PATENT DOCUMENTS

| | | | |
|---|---|---|---|
| 3,800,388 | 4/1974 | Borner et al. | 356/153 |
| 3,892,488 | 7/1975 | Edmonds | 356/138 |
| 3,999,841 | 12/1976 | Dakss et al. | 350/320 |
| 4,289,374 | 9/1981 | Franken et al. | 356/138 |
| 4,294,546 | 10/1981 | Killmann et al. | 356/399 |
| 4,474,469 | 10/1984 | Abe | 356/153 |
| 4,738,174 | 4/1988 | Bloomquist | 83/53 |

FOREIGN PATENT DOCUMENTS

| | | | |
|---|---|---|---|
| 2810673 | 9/1978 | Fed. Rep. of Germany | 356/153 |
| 0693111 | 10/1979 | U.S.S.R. | 356/153 |
| 0706694 | 12/1979 | U.S.S.R. | 356/153 |
| 1253693 | 8/1986 | U.S.S.R. | 356/399 |

*Primary Examiner*—F. L. Evans
*Attorney, Agent, or Firm*—David W. Tibbott; Bernard J. Murphy

[57] ABSTRACT

For a device having first and second, centrally-bored conduits in substantially collinear alignment along a longitudinal axis, the method checks collinearity of the conduits. Each conduit has a discrete inside diameter, and the method comprises directing light through the conduit which has the greatest inside diameter and displaying the light on a planar surface, downstream thereof, as a circular image. Then, light is directed through a second of said conduit create an emerging beam, and displaying the beam on the planar surface to ascertain its central, or offset, impingement relative to the circular image.

7 Claims, 2 Drawing Sheets

METHOD OF CHECKING COLLINEARITY

This invention pertains to methods of checking collinearity in devices, and in particular in devices having two, axially-spaced, albeit substantially collinearly aligned conduits, the same having applicability to fluid-jet-cutting apparatus, and in particular to a fluid-jet-cutting nozzle assembly such as is used in such apparatus. For exemplary purposes, the novel method shall be disclosed with reference to such nozzle assemblies.

The nozzle assemblies, to which this invention has especial applicability, commonly comprise a nozzle body, a nozzle, and a jet orifice element, the three being centrally bored and disposed for longitudinal alignment of the bores substantially along an axis.

Due to manufacturing tolerances, and machining imprecisions, it frequently occurs that the jet orifice element and nozzle bores are not in true, axial alignment. Consequently, the highly-pressured fluid jet, passing through the bore in the element, can enter the bore in the nozzle slightly off center and migrate toward, and impinge against, the wall of the nozzle bore. As a result, and especially if the jet has abrasive particulate therein, the nozzle bore becomes distorted, and the nozzle itself is soon unusable and must be replaced.

What has been needed is a facile method of checking the collinear alignment of conduits, such as a jet orifice element, and a nozzle, in a fluid-jet-cutting device, or in other such devices having two, substantially collinearly aligned conduits of diverse inside diameters.

It is particularly an object of this invention, therefore, to set forth, in a device having two axially-spaced, albeit substantially collinearly aligned, conduits of diverse inside diameters, a method of checking collinearity of said conduits, comprising the steps of directing light through a first one of the conduits which has the greatest inside diameter; interposing a planar surface transverse to, and downstream of, the first conduit, to display the light directed therethrough as a circular image on the planar surface; directing light through a second one of the conduits to create an emerging light beam therefrom; and displaying the beam on the planar surface to ascertain whether its impingement is centered relative to the circular image, or offset relative to the center of the image.

Further objects of this invention, as well as the novel features thereof, will become more apparent by reference to the following description, taken in conjunction with the accompanying figures, in which.

Figure 2:
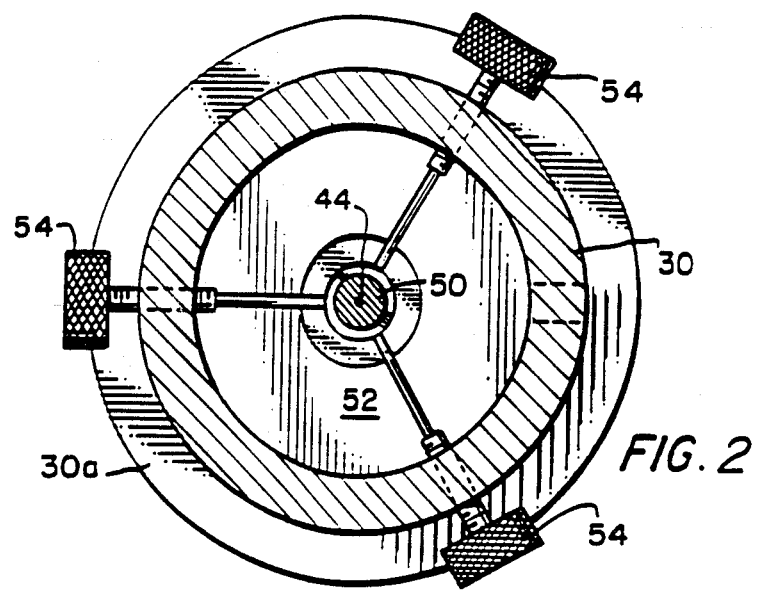
FIG. 2 is a cross-section taken along section 2—2 of FIG. 1.
Figure 1:
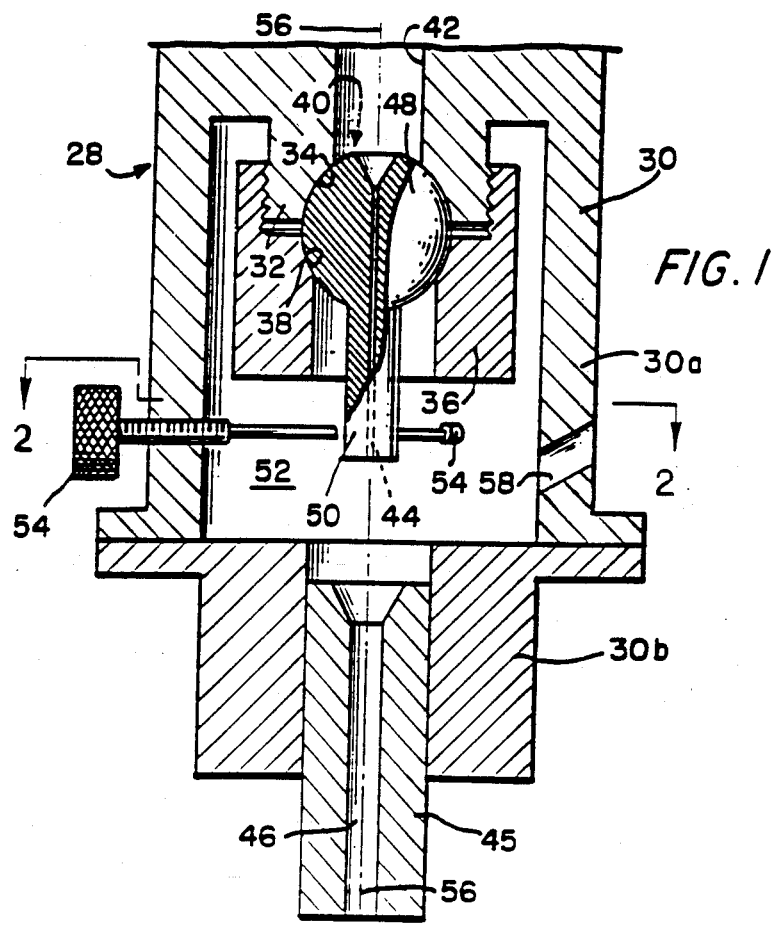
FIG. 1 is a longitudinal cross-section of an embodiment of a fluid-jet-cutting nozzle assembly with which the novel method is capable of practice.
Figure 3:
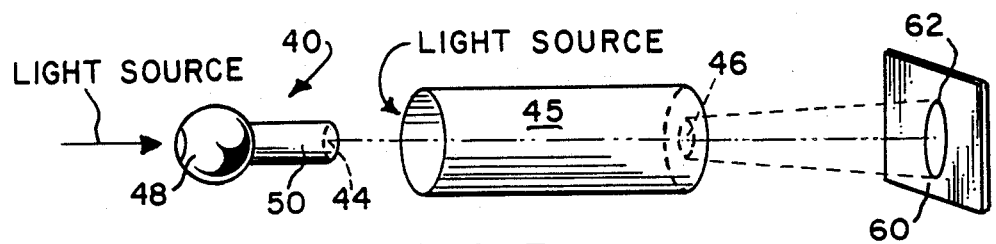
FIG. 3 is a simple line illustration of the jet orifice element, the nozzle, the light beams, and the target or planar surface.

In FIG. 1, only the outlet end of a nozzle assembly 28 is shown. The nozzle body 30 comprises two, bolted together sections 30a and 30b. Section 30a has a prominent, externally-threaded land 32 with an arcuate seat 34 formed thereon.

The body section 30a has a center bore 42, the element 40 has a center bore 44, and so has the nozzle 45 a center bore 46. The latter has a significantly greater inside diameter than has bore 44. Element 40 has a spherical-shaped body portion 48 and a straight shank portion 40 extending therefrom. The body portion 48 is captured, albeit movable in universal or slewing directions, between the nut 36 and body section 30a. The shank portion 50 extends into a mixing chamber 52.

If the ports 44 and 46 are not in true alignment, the assembly 28 has a means for making the necessary correction. Three screws 54 are in penetration of the wall of body section 30a and are arrayed about the shank portion 50. By turning the proper screws 54, the shank portion 50 can be displaced, relative to the axis 56, to align the path of the stream exiting the element 40 with the bore 56 of the nozzle 45—as necessary, due to any axial misalignment of the nozzle 45.

Port 58 is the entry way for abrasive particulate into the mixing chamber 52, if such particulate is to be used.

In accordance with the invention, a source of light is directed through the port 58 for its exit through the center bore 46 of the nozzle 45. A planar surface 60 is set in traverse of the nozzle 45 in order that the aforesaid directed light will display on the surface 60 as a circular image 62. The light source may be a battery-powered flashlight, an incandescent lamp, or the like. Then a light source is directed through the center bore 42, of the body section 30a for its travel through the center bore 44 of the element 40. The same emerges from the nozzle assembly 28 as a fine beam and impinges on the target or planar surface 60.

Figure 4:
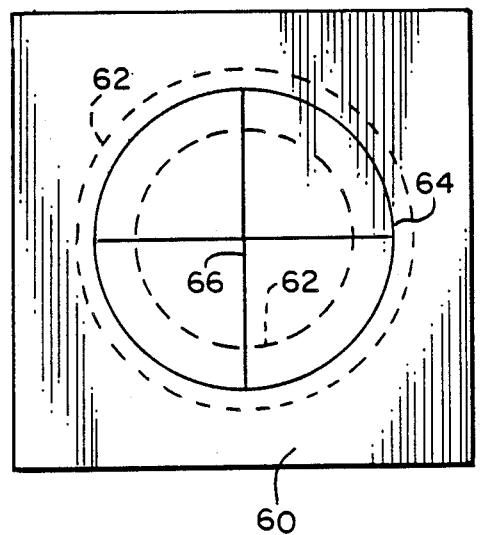
FIG. 4 is an elevational view of the target.

As shown in FIG. 4, the target or planar surface 60 has both a circle 64 and a reticle 66 inscribed thereon. Clearly, if the fine beam of light emerging from the nozzle assembly impinges on the center of the reticle 66, it is in true collinearity with the image 62. If it is out of alignment, then the screws 54 are employed to correct the alignment.

According to one practice of the invention the planar surface 60 is luminescent, so that one may first direct light through the port 58, to cause the surface to luminesce, and then direct light through the bore 42, and out of the nozzle assembly 28, to impinge on the target or planar surface 60. In this, of course, the target or surface 60 would need to be at least partially shaded from ambient illumination.

In another practice of the invention, a laser beam may be directed through the bore 44, and out of the nozzle assembly, while standard light is directed into the port 58. If the standard light, incandescent or the like, is too intense, however, the laser beam may diffuse, during its travel and become indistinguishable.

A very simple practice of the invention requires but a single light source. In this, the light is directed through the port 58 to emerge as the circular image 62 on the target 60. Using a target which has the circle 64 inscribed thereon, and the reticle 66 as well, the distance between the nozzle 45 and the target 60 must be adjusted until the image 62 and the circle 64 coincide exactly. Then, leaving the distance as adjusted for the aforesaid coincidence, the light, from the same source, is then directed into the bore 42, and bore 44, for exit from the nozzle assembly 28 and impingement on the target 60. The screws 54, then, again, can be used to adjust the attitude of the element, 40, as necessary, until the light emerging from the bores 42 and 44 (and the nozzle 45), impinges dead center on the reticle 66. Obviously, if the fine beam from bores 42 and 44 (and nozzle 45) zeroes in on the circle 64, it will be exactly collinear with the nozzle 45.

While I have described my invention in connection with specific practices thereof, it is to be clearly understood that this is done only by way of example and not as a limitation to the scope of my invention as set forth in the objects thereof and in the appended claims.

I claim:

1. In a device having two, axially-spaced, albeit substantially collinearly aligned, conduits of diverse inside diameters, a method of checking collinearity of said conduits, comprising the steps of:

directing light through a first one of the conduits which has the greatest inside diameter;

interposing a planar surface transverse to, and downstream of, the first conduit, to display the light directed therethrough as a circular image on the planar surface;

directing light through a second one of the conduits to create an emerging light beam therefrom; and displaying the beam on the planar surface to ascertain whether its impingement is centered relative to the circular image, or offset relative to the center of the image.

2. The method, according to claim 1, wherein:

said interposing step comprises setting, transverse to the first conduit, as aforesaid, a planar surface which has a circle inscribed thereon; and adjusting the proximity between said first conduit and said planar surface until the circular image and the inscribed circle coincide.

3. The method, according to claim 1, wherein:

said interposing step comprises setting a planar surface transverse to said first conduit, as aforesaid, which surface is luminescent.

4. The method, according to claim 1, wherein:

said step of directing light through a second one of said conduits comprises directing a laser beam therethrough.

5. The method, according to claim 2, wherein:

said setting step further comprises providing a planar surface which has a reticle inscribed within said circle.

6. The method, according to claim 1, wherein:

said interposing step comprises setting, transverse to said first conduit, as aforesaid, a planar surface which has a reticle inscribed thereon.

7. The method, according to claim 2, further including:

providing a single light source; and wherein said step of directing light through the first conduit comprises using the single light source; and said step of directing light through a second one of the conduits is performed following said adjusting step, and comprises using the single light source

* * * * *